United States Patent [19]

Zeuch

[11] 4,162,293
[45] Jul. 24, 1979

[54] APPARATUS FOR PREPARATION OF A COMPOUND OR AN ALLOY

[75] Inventor: Klaus Zeuch, Eckental, Fed. Rep. of Germany

[73] Assignee: Siemens Aktiengesellschaft, Munich, Fed. Rep. of Germany

[21] Appl. No.: 754,518

[22] Filed: Dec. 27, 1976

Related U.S. Application Data

[63] Continuation of Ser. No. 559,015, Mar. 17, 1975, abandoned.

[30] Foreign Application Priority Data

Mar. 27, 1974 [DE] Fed. Rep. of Germany ....... 2414827

[51] Int. Cl.² ............................................. B01J 17/26
[52] U.S. Cl. .................................... 422/247; 156/613
[58] Field of Search ........... 23/273 SP, 273 A, 273 B, 23/273 Z, 281, 290; 156/601, 609, 610, 611, 616, 617, 613, 614; 423/111, 299

[56] References Cited

U.S. PATENT DOCUMENTS

| | | |
|---|---|---|
| 2,893,847 | 7/1959 | Schweikert et al. ............ 23/273 SP |
| 3,188,373 | 6/1965 | Brunet et al. .................... 23/273 SP |
| 3,366,454 | 1/1968 | Foiberth et al. ..................... 156/616 |
| 3,725,284 | 4/1973 | Touchy .................................. 156/611 |
| 3,877,883 | 4/1975 | Berkman et al. ....................... 423/11 |
| 3,884,642 | 5/1975 | Benedict ............................. 23/273 A |

OTHER PUBLICATIONS

C. T. Frosch et al., J. of Electrochemical So., vol. 108, pp. 251–257, 1961.
F. A. Cunnell et al., J. of Scientific Instruments, vol. 37, 11/60, pp. 410–414.

Primary Examiner—Hiram H. Bernstein
Attorney, Agent, or Firm—Kenyon & Kenyon

[57] ABSTRACT

Apparatus for the preparation of a semiconductor compound having one component with a substantially higher vapor pressure than the other using a closed horizontal ampule in a pressure vessel with the two ends of the ampule located in respective heating ovens in which the ampule is self supporting without a support tube in the zone between the heating ovens thereby permitting this zone, which is highly heated by means of an inductive heating apparatus or the like, to be cooled directly by means of a cooling gas circulating in the pressure vessel and in which the coupling of the heating means to a graphite boat or the like inside the ampule is improved.

8 Claims, 3 Drawing Figures

APPARATUS FOR PREPARATION OF A COMPOUND OR AN ALLOY

This is a continuation of application Ser. No. 559,015 filed Mar. 17, 1975 and now abandoned.

BACKGROUND OF THE INVENTION

This invention relates to an apparatus for the preparation of a compound or an alloy having one component with a substantially higher vapor pressure than the other, preferably for the preparation of a semiconductor compound with elements selected from group III and V of the periodic table, particularly gallium phosphide, in general and more particularly to an improved apparatus in which the tube or ampule used in such an apparatus is self supporting between a pair of heating ovens thereby permitting improved cooling.

Apparatus of this general type is known in which the components or elements to be combined to form the compound are situated in a closed horizontal reaction tube with its ends surrounded by hollow cylindrical heating ovens, one oven being provided on each end. The heating ovens are arranged in the axial direction of the tube, one behind the other at a predetermined spacing. At the portion of the tube situated between the two heating ovens, a separate heating device, generally a high-frequency heating coil is provided. The entire system is disposed within a pressure vessel, also referred to as an autoclave, having an internal pressure which can be varied as a function of the pressure inside the tube.

As is well known, gallium phosphide has found much use recently in the manufacture of light-emitting diodes for the visible range because of its large band gap. Polycrystalline gallium phosphide, which is used as the starting material for the manufacture of suitable single crystals, is advantageously synthesized through the reaction of gallium with phosphorus in a closed system.

Typical of one manner of making polycrystalline gallium phosphide is the direct synthesis method using gallium and phosphorus at a temperature of about 1500° C. and a pressure of 6 to 35 bar as disclosed by Frosch and Berick in Journal of the Electrochemical Society, Vol. 108, page 251, 1961. The components of the semiconductor compound are placed in a quartz tube which is arranged in a furnace and is provided with a high frequency heating device. The high-frequency heating device is inductively coupled to a graphite boat located in the tube and containing one of the components. For the reaction, the boat with the semiconductor component, such as gallium, is moved through the inductively heated zone of elevated temperature within the heating device. After an additional pass, dense polycrystalline gallium phosphite containing, at the end of a synthesized bar, free gallium is obtained. The induction coil for the high-frequency heating device is brought into the pressure vessel radially and is therefore not movable in the axial direction of the system. Thus, to obtain the zone melting of the gallium, the tube must be moved and is supported for this purpose in a separate guide tube. [See also Bulletin "TRG 300 Gallium Phosphite Synthesis Systems", published by Metals Research, England.]

At the high temperatures which are required for the synthesis of the semiconductor compound, the strength of the wall of the tube is considerably reduced. Because of this the tube is disposed in a pressure vessel having a pressure set higher than the pressure in the tube. Since the internal pressure of the tube cannot be measured the setting of the necessary counter-pressure in the autoclave over the wide range of possible operating pressures is difficult. It will be recognized that the internal pressure of the tube is influenced by various factors such as the temperature of the phosphorus source and thus the vapor pressure of the phosphorus building up above it. In addition, a varying phosphorus pressure can build up in the reaction tube because of the fact that the reaction does not take place in a completely uniform manner. Furthermore, the phosphorus vapor pressure attainable at a given temperature of the phosphorus source also depends on the degree of polymerization of the phosphorus which, as is well known, constitutes a polymorphous element. Although operating conditions can be chosen so that the phosphorus present is completely evaporated as taught by German Pat. No. 1,029,803, the method disclosed therein, namely that of operating without a base body, cannot be used for larger charges.

In systems of this nature, the reaction tube is generally made of quartz. The pressure stability of hollow quartz bodies first increases with increasing temperature until at a temperature of about 800° C. it is about one-third higher than at room temperature. However, as the temperature goes above this temperature the stability declines and the maximum temperature at which such quartz ampoules can still be used, does not greatly exceed 900° C. In the region of the reaction temperature of gallium mentioned above, the strength of the wall is thus reduced considerably.

One manner of overcoming these problems is disclosed in U.S. application Ser. No. 455,912 filed Mar. 28, 1974 now U.S. Pat. No. 3,991,163 and assigned to the same assignee as the present invention. The method taught therein synthesizes the desired components at a temperature which is considerably below the melting point of the compound produced. As taught therein this is possible if provision is made for the less volatile component to be heated in a reaction zone 1 to 2 centimeters wide to a temperature 100 to 500° C. below the congruent melting temperature of the component produced. At the same time, the pressure of the highly volatile component is set to a predetermined fraction of the decomposition vapor pressure of the compound being produced. Even with this method, however, a reaction temperature is still required which is not much below 1000° C. A further disadvantage is found in this method in that the pressure stability of the quartz tube further decreases as the duration of the pressure stress is extended. Since it is more economical to work with large sized charges it is generally desireable to attempt to prepare bars of the synthesized compound or alloy which weigh several kilograms or more in a single operation. Charges of such size thus require correspondingly longer operating time. This would require, using the previously disclosed method, that the tube be subjected to high pressure for a longer time. In addition, in carrying out such a process, the danger of contamination of the reaction product at high temperatures exists. In view of these difficulties, the need for an improved apparatus of this type becomes evident.

SUMMARY OF THE INVENTION

The present invention provides such an apparatus. The invention is based on the discovery that the reaction tube or, as it is also referred to, the ampule can be operated without a support tube; i.e. an additional enclosure for the ampoule, if it is possible to remove the heat generated at the wall of the ampule in the high temperature zone which is caused by heat radiation and convection at least partially by means of a stream of coolant.

In accordance with the present invention these objects are accomplished by providing that the ends of the reaction ampule are supported in the heating oven and that the reaction ampule is arranged between the heating ovens in a self supporting manner. At least one end of the reaction ampule will preferably rest on a spoon-like support whose surface profile is matched to the surface profile of the end of the reaction ampule. The support is then attached to a push rod which is movable in the direction of the axis of the reaction ampule. In addition, means are provided to direct the flow of coolant over the highly heated reaction zone portion of the ampule.

The over pressure required for stabilizing the reaction ampule in the autoclave is normally produced by a gas charge therein. It has been found that a gas flow, which can be utilized for cooling the wall of the ampule, is set up in the high temperature zone portion of the reaction ampule situated between the two heating ovens due to the heating of the wall of the ampule. The cooling effect of this gas can be additionally increased considerably by associating a separate cooling device with the high temperature zone of the ampule. As this cooling device, a high frequency coil cooled by a separate cooling medium, preferably water, and whose diameter is chosen to not be substantially larger than the outside diameter of the reaction ampule can be used. In such an arrangement the distance between the heating coil and the wall of the ampule will be quite small and a considerable portion of the heat from the wall of the ampule will be removed by the cooling medium of the heating coil.

In particular it is advantageous if the jacket of the autoclave is designed as a double jacket so that between the two enclosures a hollow cylindrical cooling channel is formed. A coolant such as water is then directed through this channel. By intensively cooling the shell in this manner sufficient heat can be removed from the gas of the autoclave which then serves as a cooling gas.

As disclosed in Application Ser. No. 559,014, now U.S. Pat. No. 4,038,595 assigned to the same assignee as the present invention, a particularly favorable effect on the cooling gas flow within the high temperature zone of the ampule is obtained when the outer shell of the two heating ovens has a substantial difference from the inner shell of the autoclave. As disclosed therein, in some cases it is advisable to also make the inside length of the pressure vessel substantially greater than the overall length of the two heating ovens arranged one behind the other in the direction of the ampule. With such a design a closed partial circulation develops around each of the heating ovens. The ends facing away from the reaction ampule of the heating ovens are preferably closed preventing any portion of the stream of cooling gas traveling through the oven. This additionally insures that a small thermal gradient will exist in the radial direction within the oven.

With such a self supporting arrangement for the reaction ampule, ingots weighing kilograms can be prepared. At the same time ampules of the necessary size can be made of commercially available quartz tubes with a relatively small wall thickness.

DETAILED DESCRIPTION OF THE PREFERRED EMBODIMENT

Figure 1:
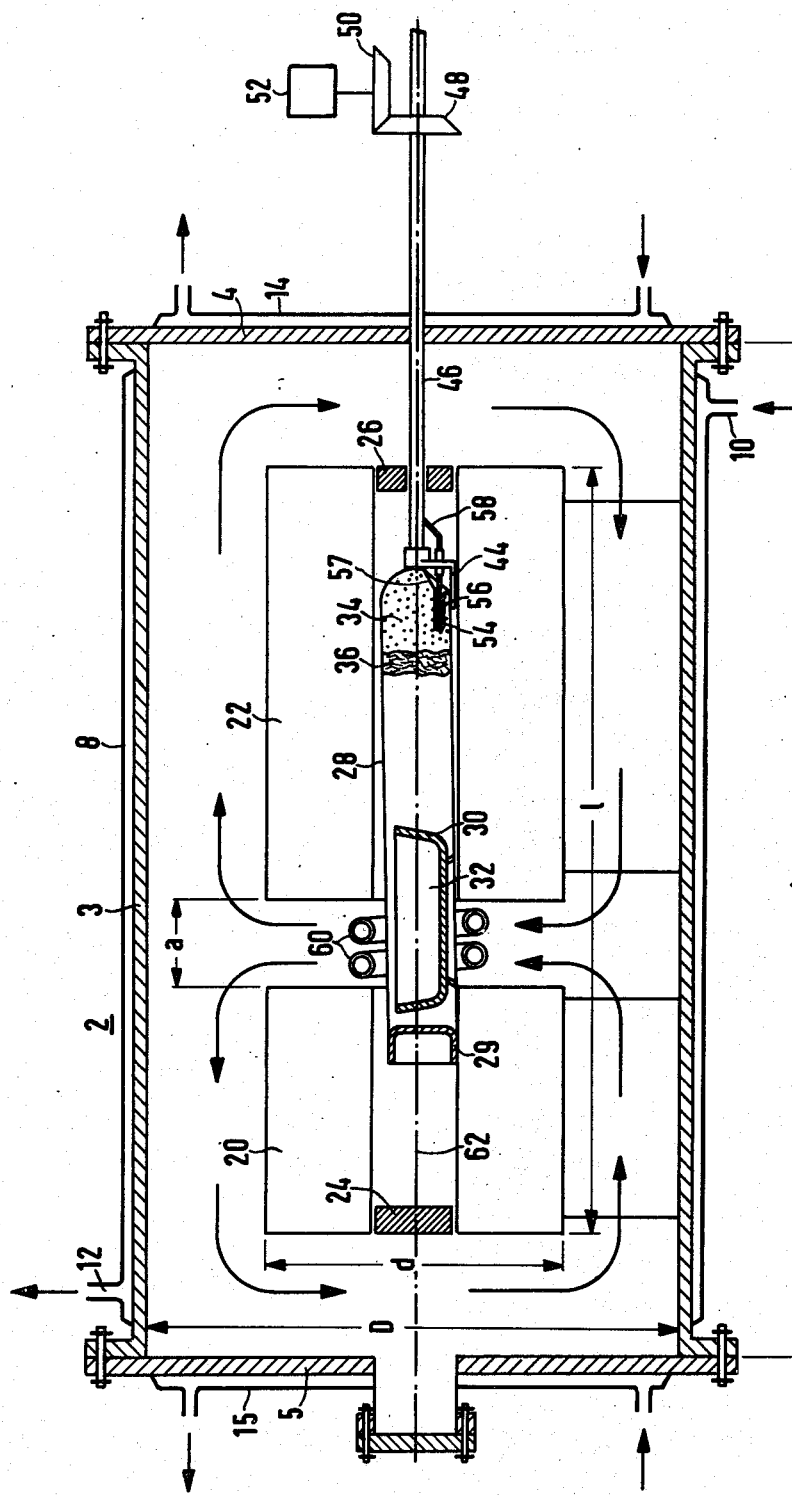
FIG. 1 is a cross-sectional schematic view of an apparatus according to the present invention.

FIG. 1 illustrates a pressure vessel or autoclave 2 made up of a cylindrical shell 3 having covers 4 and 5. The shell 3 is surrounded by a separate cooling jacket 8 which is provided with a cooling inlet 10 and a coolant discharge 12. Lids 4 and 5 are similarly provided with cooling jackets 14 and 15 respectively which also have inlets and outlets for a coolant. Disposed within the autoclave 2 are ovens 20 and 22 arranged one behind the other in the axial direction. The ovens are closed off at their free ends with a seal in the form of plugs 24, 26, respectively. Within each of the ovens are found the ends of a quartz tube or ampule 28 which has an outside diameter of, for example, 60 millimeters and which contain a graphite boat 30. The boat 30 contains one component 32 of the semiconductor component to be produced. This component may be, for example, gallium. The second component 34, which will be, for example, phosphorous, is disposed at the right-hand end of the tube 28. It is located between the end of the tube and a gas pervious material such as quartz wool 36. The second component is heated by the oven 22 which, for this reason, is generally referred to as the phosphoric oven. The oven 20 is generally referred to as the after-heating oven.

The end of the reaction tube 28 has a cap 29 sealed in with its end resting on the inside wall of the heating oven 20. The other end of the reaction tube 28 is supported on a holding device 44 preferably designed in the shape of a spoon and which is attached to a push rod 46. The push rod 46 is coupled to drive means 52 by means of bevel gears 48 and 50 which are in meshing relationship. The push rod 46 will be in the form of a lead screw which engages matching gears internally in bevel gear 48 to impart a linear motion to the pushrod 46.

For purposes of measuring the temperature of the phosphorus 34 directly, a thermocouple 54 is shown as being arranged in a tube 56 sealed into the wall of the tube 28 and extending into the phosphorus 34. The electrical leads 58 from the thermocouple 54 will preferably be brought out through the pushrod 46, which for this purpose can be made hollow. It can then be connected to an electronic control or regulating device not shown in detail, to control the pressure in the autoclave 2. This input from the thermocouple will provide an actual value input to the control device which, in conventional fashion, will control the pressure as a function thereof. This temperature sensor is disclosed in more detail in application Ser. No. 561,342, now U.S. Pat. No. 3,981,186 and the use of its output in U.S. application Ser. No. 516,314, now U.S. Pat. No. 3,988,920 both assigned to the same assignee as the present invention.

The tube 56 sealed into reaction tube 28 also is useful in centering the reaction tube and preventing it from rotating about its longitudinal axis when transported within the oven 20 and 22 by means of the pushrod 46. To accomplish this, a mechanically sufficiently stable thermocouple 54 is used. What are referred to as tubular thermoelements have the necessary properties for this purpose. As disclosed in the aforementioned U.S. Pat. No. 3,981,196, the tube 56 is advantageously sealed into the wall of the reaction tube 28 using a conical transition section 57. This facilitates sliding of the end of the reaction tube 28 onto the support 44. The conical transition section 57 brings about a centering action of the thermocouple 54 when the reaction tube 28 slides onto the support 44. In accordance with the present invention, the heating ovens 20 and 22 along with the heating means 60 in the form of an induction coil must be capable of relative movement with respect to the tube 28. In the illustrated embodiment, the induction coil 60 is a hollow conductor through which a cooling medium preferably water, will be conducted. The inside diameter of the overall coil 60 is selected so as to match the outside diameter of the tube 28. The spacing of the coil turns from the envelope of the reaction tube 28 is maintained very small and will preferably only be a few millimeters, i.e. the range of 2 to 12 mm and more particularly 3 to 6 mm. Through such dimensioning, a major portion of the heat of the wall of the tube is removed by cooling medium of the heating coils 60 so that the temperature of the wall is limited to a safe level.

In the illustrated embodiment, the reaction tube 28 is movable in the axial direction of the system with respect to the heating ovens and coil 60. This direction of motion is indicated by the dash-dot line 62. Movement is obtained through the use of the drive means 52 such as a motor coupled through the gears 50 and 48 to the drive rod 46. This drive system is used to cause the boat 30 to move through the heating zone of the heating coil 60.

However, it is also possible to support the reaction tube 28 in a stationary manner within the pressure vessel and to mount the oven and heating means 60 for movement in the axial direction as disclosed in application Ser. No. 559,016, now U.S. Pat. No. 4,018,566 assigned to the same assignee as the present invention. In such a case the left-hand end of the reaction tube 28 would also be supported in a support device similar to that at the right-hand end and the ovens and coil 60 mounted for axial movement, i.e. the pushrod would be brought out through the plug 24 and lid 5. This type of an embodiment, as indicated in the referenced application, has as its major advantage that the ampule remains completely free of vibrations during operating so that a single crystal ingot can be manufactured.

As is evident from the Figure the relative dimensions of the oven and the autoclave 2 are such as to provide a reasonably large space surrounding the overall apparatus including the ovens 20 and 22, the heating means 60 and the tube 28. As a result, cooling gas within the autoclave 2 and having a flow as indicated by the unlabelled arrows on the Figure will flow in direct contact with the portion of the tube 28 between the two heating ovens and which is in the vicinity of the heating means 60. The gas, which is heated as it passes over this heated zone will then be cooled by the cylindrical wall 3 of the autoclave 2 which, in turn, is cooled by the cooling medium flowing between the wall 3 and the jacket 8. Similarly, cooling will take place at the covers 4 and 5. Note, the gas heated in the middle region of the vicinity of the heating coil 60 will rise, travelling along the upper surface of the autoclave and be cooled as it moves therealong and down the covers 14 and 15 to the bottom of the autoclave after which it will again flow toward the heated region to replace the heated gas which has risen due to convection. In this manner the flow paths indicated are established. Through this flow, the average wall temperature of the reaction tube 28 can be maintained in this region at about 750° and should not exceed 850° C. Through this intensive cooling the ampule can be disposed within the autoclave in a self-supporting manner, i.e. it does not require a separate guide tube even for relatively large charges.

The seals 24 and 26 of the two ovens 20 and 22 prevent convection through the inner spaces of the ovens which could result in an unfavorable temperature distribution within these ovens.

Between the outer shell of the ovens 20 and 22 and the inner wall 3 of the autoclave as well as between the ends of the ovens and the covers 4 and 5 a sufficient space is preferably provided in the manner shown to obtain the necessary closed gas flow. Typically, the outside diameter of the reaction tube can be 60 millimeters, the distance a between the two ovens 20 and 22, 100 millimeters; the outside diameter d of the ovens 20 and 22, 150 millimeters and an inside diameter D of the autoclave 250 milimeters. The length l, for example of the two ovens arranged one behind the other with the spacing of a can be 960 mm and the inside length L of the autoclave tube 1260 mm. With such dimensions good cooling in the zone of high temperature of the reaction tube 28 is obtained. With dimensions, approximately 8000 to 9000 cm$^2$ of the wall of the pressure vessel are useable as cooling area. With this much cooling space, the portion of the wall of the reaction tube to be cooled, which has an area of about 150 to 200 cm$^2$, will be held to a temperature which does not appreciably exceed 800° C. during the synthesis. Preferably this temperature will be maintained in the range of 600° to 800° C. and more preferably to between 650° and 700° C. when gallium phosphide is being prepared.

The cooling effect due to convection increases with increasing gas pressure and with an increase in the thermal conductivity in the gas being used. Nitrogen can advantageously be used as a cooling gas. If with a normal ambient pressure of the cooling gas a wall temperature of the reaction tube 28 in the high temperature zone of 780° C. is obtained, the same wall temperature will be reduced to about 650° C. at a pressure of the cooling gas of about 8 bar. A curve illustrating this relationship is contained in application Ser. No. 559,014, now U.S. Pat. No. 4,038,595 assigned to the same assignee as the present invention. Since the cooling effect of the gas increases with pressure, its pressure i.e. the pressure in the vessel 2, will preferably be kept even higher than the internal pressure in the reaction ampule 28.

The apparatus of the present invention is particularly well suited for the synthesis of semiconductor compounds, particularly gallium phosphide. However, it can also be used for the preparation of other compounds and alloys. Another component with a high partial vapor pressure is arsenic and indium and aluminum may also be used as reaction components in place of the gallium. Examples of the manner in which the apparatus is used are given in the aforementioned U.S. Pat. No. 4,038,595.

Figure 2:
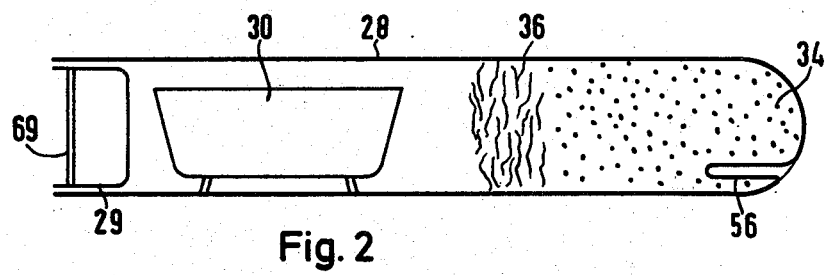
FIG. 2 illustrates a first embodiment of a reaction ampule.

FIG. 2 illustrates one embodiment of a reaction tube or ampule which may be used in the apparatus of FIG. 1. In this embodiment the boat 30 is placed on the left-hand portion of the ampule 28 and phosphorus 34 in the right-hand end held in place with quartz wool 36. As desribed above and in U.S. Pat. No. 3,981,196 a measuring tube 56 is sealed into the end of the ampule 28 extending into the phosphorus 34. For sealing off the tube, a hollow cylindrical cap 29, closed on one side is inserted into the left end of the ampule 28. The cap 29 can advantageously be further provided with a cross piece 69 which is fused to the inside wall of the cap 29.

Once the ampule 28 is charged with the two reaction components the cap 29 is then inserted into the opened end of the ampule. Then, the portion of the open end of the ampule 28 which preferably will have some overhang is connected to a vacuum pump and the ampule 28 evacuated. When the desired vacuum is reached, the cylindrical portion of the ampule 28 surrounding the cap 29 is heated and compressed by external pressure means to seal the outer cylindrical portion of the cap 29 to the inner cylindrical surface of the ampule 28 in a vacuum-tight manner. Such sealing is preferably carried out using an oxy-hydrogen torch and a pressure of about $10^{-5}$ Torr. In this manner the closing of the reaction ampule 28 in a vacuum tight manner is obtained in simple fashion.

Figure 3:
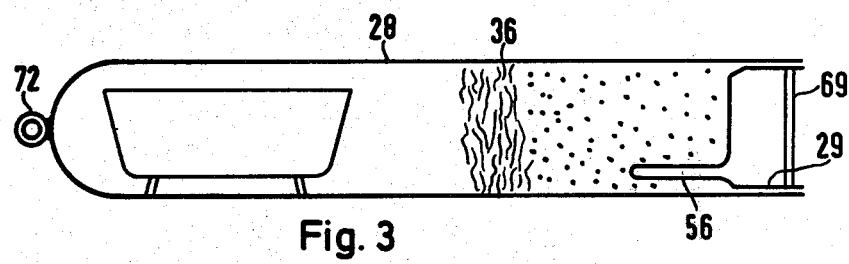
FIG. 3 illustrates a second embodiment of a reaction ampule.

FIG. 3 illustrates a further embodiment of the reaction ampule or tube 28. In this case, the sealing cap 29 is at the opposite end and has formed therein the measuring tube 56. The left-hand end of the reaction tube 28 is provided with an eye 72 which can be used to hold the ampule or tube 28 in an appropriately designed holding device along with transporting the reaction ampule 28 by pushing or pulling. The cross piece 69 in the sealing cap 29 may also be used for transporting the reaction ampule 28. For example, a push rod with a hook on its end can be used to withdraw the reaction ampule 28 from the ovens 20 and 22.

Thus, an improved apparatus for the preparation of a compound or alloy whose one component has the substantially higher vapor pressure than the other in a closed horizontal reaction tube heated by hollow cylindrical ovens and an induction heating device has been shown. Although specific embodiments have been illustrated and described, it will be obvious to those skilled in the art that various modifications may be made without departing from the spirit of the invention which is intended to be limited solely by the appended claims.

What is claimed is:

1. In apparatus for the preparation of a compound or an alloy having one component with a substantially higher vapor pressure than the other using a closed horizontal reaction ampule having its ends disposed in and surrounded by first and second hollow cylindrical heating ovens with the reaction ampule and ovens arranged within an enclosed pressurized vessel at a pressure in the range of 6 to 35 bar, the ovens being arranged one behind the other in the direction of the axis of the ampule at a predetermined distance from each other, and inductive heating means for heating material disposed within the ampule in a narrow zone in the middle portion between the ovens to a temperature of about 1500° C. whereby heat is radiated inside the ampule and heats the wall of the ampule at said middle portion, the improvement comprising the ampule having its ends supported within the respective heating ovens and its middle portion between the heating ovens supported only by the rigidity of the ampule itself, and means for intensely cooling the wall of the ampule at said middle portion by convection within said pressurized vessel.

2. An apparatus according to claim 1 wherein at least one end of said reaction ampule is supported on a member with a support surface having a profile matched to the profile of the end of the reaction ampule.

3. An apparatus according to claim 2 wherein said member with a support surface is attached to a push rod supported for movement in the direction of the axis of said reaction ampule.

4. An apparatus according to claim 3 and further including a small hollow cylindrical tube having a closed end extending into the ampule in the direction of its axis and having an open end sealed into the end of said reaction ampule.

5. An apparatus according to claim 4 and further including a tubular thermocouple inserted in said tube and fastened to said member with a support surface.

6. An apparatus according to claim 1 and further including a high frequency induction coil made up of hollow coils through which a cooling medium can be directed, the inside diameter of said high frequency induction coil being selected so as to closely match the outside diameter of said reaction ampule, said high frequency induction coil surrounding the portion of said ampule between said two heating ovens.

7. An apparatus according to claim 1 wherein said reaction ampule is closed at one end by a hollow cylindrical cap having a cylindrical outside surface which is fused to the inside wall of said reaction ampule.

8. An apparatus according to claim 7 wherein said hollow cylindrical cap further contains a cross-member.

* * * * *